(12) United States Patent
Terada

(10) Patent No.: US 8,228,550 B2
(45) Date of Patent: Jul. 24, 2012

(54) IMAGE PROCESSING DEVICE AND IMAGE PROCESSING PROGRAM FOR PRODUCING LAYOUT IMAGE INCLUDING PLURAL SELECTED IMAGES

(75) Inventor: Masahiro Terada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1414 days.

(21) Appl. No.: 11/822,601

(22) Filed: Jul. 9, 2007

(65) Prior Publication Data

US 2008/0007783 A1    Jan. 10, 2008

(30) Foreign Application Priority Data

Jul. 7, 2006   (JP) ................................. 2006-187479

(51) Int. Cl.
*G06F 15/00* (2006.01)
*G06K 1/00* (2006.01)
(52) U.S. Cl. ..................................... 358/1.18; 358/1.16
(58) Field of Classification Search .................. None
See application file for complete search history.

(56) References Cited

U.S. PATENT DOCUMENTS

| 2004/0125423 A1 | 7/2004 | Nishi et al. |
| 2007/0208717 A1* | 9/2007 | Matsui .............................. 707/3 |

FOREIGN PATENT DOCUMENTS

| JP | 2002-42116 A | 2/2002 |
| JP | 2004-207987 A | 7/2004 |

* cited by examiner

*Primary Examiner* — Thierry Pham
(74) *Attorney, Agent, or Firm* — Sughrue Mion, PLLC

(57) ABSTRACT

When an image processing program runs on a PC to produce a layout image in which plural selected images are inserted separately into image display frames, a CPU functions as a browser controller, a face image counter, an average number calculator, a pattern selector, a table, and an image layout section. The face image counter counts face images in each selected image. The average number calculator calculates an average number of the face images in a single selected image. Plural layout patterns of the image display frames are established in the table, which also defines the number of the image display frames and a threshold number of the face images for each layout pattern. Comparing the average number with the threshold number, the pattern selector selects the layout pattern. The image layout section inserts the selected images into the image display frames in the selected layout pattern.

14 Claims, 8 Drawing Sheets

IMAGE PROCESSING DEVICE AND IMAGE PROCESSING PROGRAM FOR PRODUCING LAYOUT IMAGE INCLUDING PLURAL SELECTED IMAGES

FIELD OF THE INVENTION

The present invention relates to image processing device and program for producing a layout image in which plural selected images are separately inserted into image display frames.

BACKGROUND OF THE INVENTION

There is a practical technology to detect a face of a photographed person in a digital image taken with a digital camera. This technology is utilized for other image processes, such as changing the brightness of an image to show the face with optimum brightness, and trimming the periphery of the face (hereinafter, face area) to display it in full screen.

The information (position, etc) of the detected face area can be stored, together with the shooting date and such, as accompanying information associated with the digital image. Accordingly, by equipping an image processing device or an image viewer with such a face area detecting function, it is possible to provide high added-value services using the information of the face area. Here, the image viewer is an image processing software for displaying (the list or the selection of the images) and editing (copy, delete, trim, rotate and resize) the images, and sometimes has a function to produce a layout image which contains plural selected images inserted into image display frames.

For example, Japanese patent laid-open publication No. 2004-178163 discloses an image processing device which detects the face area of a photographed person in image data and combines a preset decorative image, such as a hat or an eyeglass, of appropriate size and position with the person.

Also, Japanese patent laid-open publication No. 2004-207987 discloses a print system including a digital camera that detects a face area from the image data, and a memory to store the position and size information of the face area. Based on this information, the photographed person is printed, on the printer, with an appropriate position and size.

Further, Japanese patent laid-open publication No. 2002-042116 discloses an image processing device which retrieves image data of several persons, and adjusts these data such that every face has approximately the same size.

The image data thus adjusted is suitable for making a portrait list or such a layout image to list portraits. However, if a group photograph containing several persons is used in a typical layout image whose image display frames usually have the same size, each person may sometimes be too small to see. In this case, the user takes trouble to adjust each of the images and insert them into the image display frames.

SUMMARY OF THE INVENTION

In view of the foregoing, a primary object of the present invention is to provide an image processing device and an image processing program to produce a layout image in which photographed people in selected images are easily viewed.

In order to achieve the above and other objects, an image processing device according to the present invention includes a memory, an average number calculator, and a pattern selector so as to produce a layout image in which plural selected images are inserted separately into image display frames. The memory stores plural layout patterns with different numbers of image display frames. These image display frames get larger as the number of the image display frames decreases. The average number calculator detects and counts face images of photographed people in each selected image, and then calculates an average number of the face images. The pattern selector selects one of the layout patterns based on this average number, such that the face images do not become too small in the layout image.

The memory also stores a threshold number of the face images for each layout pattern. The threshold number is a proper number of the face images to be displayed in one image display frame. The pattern selector compares the threshold number with the average number when selecting the layout pattern.

It is preferred that the layout pattern with the fewest number of the image display frames is set as a default pattern. In this case, the pattern selector selects this default pattern, regardless of the average number, when the number of the selected images is less than the fewest number. Also in this case, when the number of the selected images is more than the fewest number, the average number calculator extracts as many selected images as the fewest number and calculates an average number of the face images.

The memory further stores the numbers of the image display frames in vertical and horizontal directions of the layout image for each layout pattern. It is preferred for the average number calculator to detect the face image by finding both eyes of each photographed person in the selected image. It may also be possible to provide the image processing device with an output unit for outputting the layout image to a monitor device or a printer.

An image processing device according to another preferred embodiment of the present invention includes a face image counter, an image identifying unit, and an image layout unit. The face image counter detects and counts face images of photographed people in each selected image. The image identifying unit identifies the selected image with the most number of the face images. The image layout unit inserts the identified selected image into an enlarged display frame, and does the other selected images in normal display frames. The enlarged display frame is larger than the normal display frame, and enlarges the image inserted.

It is preferred, when more than one selected image is identified, that the image identifying unit measures the sizes of the face images in each identified selected image, and then identifies the selected image with the smallest total size of the face images. It is also preferred for the face image counter to detect the face image by finding both eyes of each photographed person in the selected image.

An image processing program according to the present invention directs a personal computer to execute an average number calculating step and a pattern selecting step so as to produce the layout image. In the average number calculating step, the face images of photographed people are detected and counted for each selected image, and then an average number of the face images is calculated. In the pattern selecting step, one of plural layout patterns of the image display frames is selected based on the average number, such that the face images do not become too small in the layout image. These layout patterns are stored in a memory, and have different numbers of the image display frames. The image display frames get larger as the number of the image display frames decreases.

The memory also stores a threshold number of the face images for each layout pattern. The threshold number is a proper number of the face images to be displayed in one image display frame, and compared with the average number in the pattern selecting step.

It is preferred that the layout pattern with the fewest number of the image display frames is set as a default pattern. In this case, the default pattern is selected in the pattern selecting step, regardless of said average number, when the number of the selected images is less than the fewest number. Also in this case, when the number of the selected images is more than the fewest number, as many selected images as the fewest number are extracted, and an average number of the face images is calculated in the average number calculating step.

The memory further stores the numbers of the image display frames in vertical and horizontal directions of said layout image for each layout pattern. In the average number calculating step, the face image is preferably detected by finding both eyes of each photographed person in the selected image. It may also be possible to provide an image outputting step for outputting the layout image to a monitor device or a printer.

An image processing program according to another preferred embodiment of the present invention directs a personal computer to execute a counting step, an identifying step, and an inserting step. In the counting step, face images of photographed people are detected and counted for each selected image. In the identifying step, the selected image with the most number of the face images is identified. In the inserting step, the identified selected image is inserted into an enlarged display frame, and the other selected images are inserted into normal display frames. The enlarged display frame is larger than the normal display frame, and enlarges the image inserted.

It is preferred, when more than one selected image is identified, that the sizes of the face images are measured for each identified selected image, and the selected image with the smallest total size of the face images is identified.

According to the present invention, the layout pattern of the image display frames is changed depending on the number of people's faces in the selected images. The layout image thus produced can be displayed in full screen, and also be printed as an index print on an external printer.

Additionally, a group picture and such a picture with many people are disposed separately from other pictures in the layout image, and therefore the people of each picture are easily viewed in the layout image.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
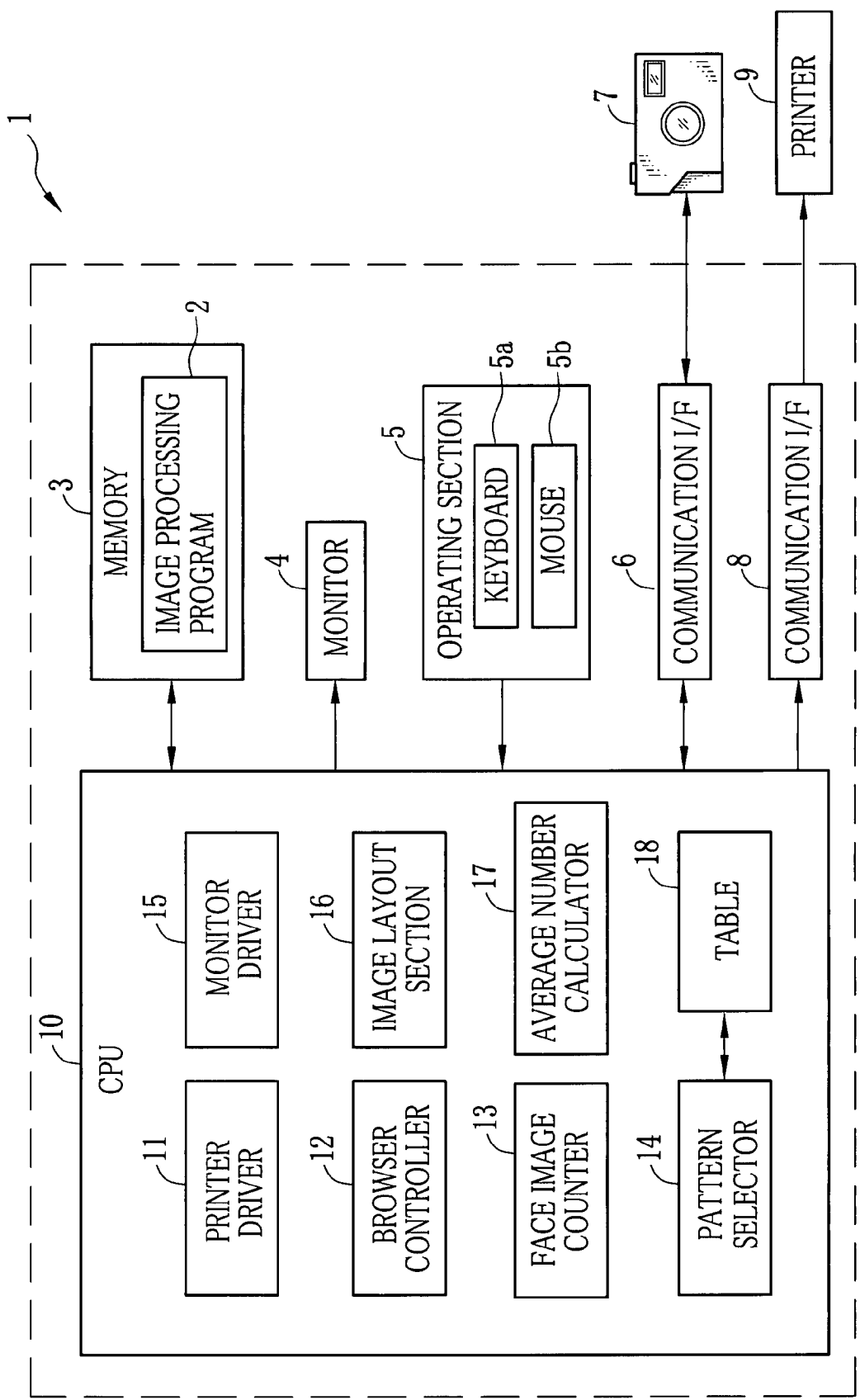
FIG. 1 is a block diagram of an image processing device according to a first embodiment of the present invention.

Referring to FIG. 1, a personal computer (hereinafter, PC) 1 is controlled by a CPU 10. Connected to this CPU 10 are a memory 3, a monitor 4, an operating section 5, and two communication interfaces (I/F) 6 and 8.

The memory 3 includes a semiconductor memory and/or a magnetic disc, and stores an image processing program 2 as well as other various programs and data to start the PC 1. Also, the memory 3 will store image data (both still images and movies) transferred from a digital camera 7 through the communication I/F 6.

The monitor 4 has an LCD or CRT screen to display the image data and various information. The operating section 5 includes a keyboard 5a and a mouse 5b. Responding to the manipulation of the operating section 5, the CPU 10 controls the operation of the PC 1. The communication I/F 6 is a USB interface or such a general interface to be connected through a USB cable to the digital camera 7 and an external device for data transmission. The communication I/F 8, on the other hand, is an RS232C interface, a LAN (Local Area Network) interface, or such a general interface to be connected thorough a serial cable or a LAN cable to a printer 9 and an external device for data transmission.

When the image processing program 2 runs on the PC 1, the CPU 10 generates a browser controller 12, a face image counter 13, an image layout section 16, an average number calculator 17, a pattern selector 14, and a table 18. Also, the CPU 10 generates a printer driver 11 and a monitor driver 15. The browser controller 12 generates and controls an image display browser 20 displayed as a GUI (Graphic User Interface) on the monitor 4.

Figure 2:
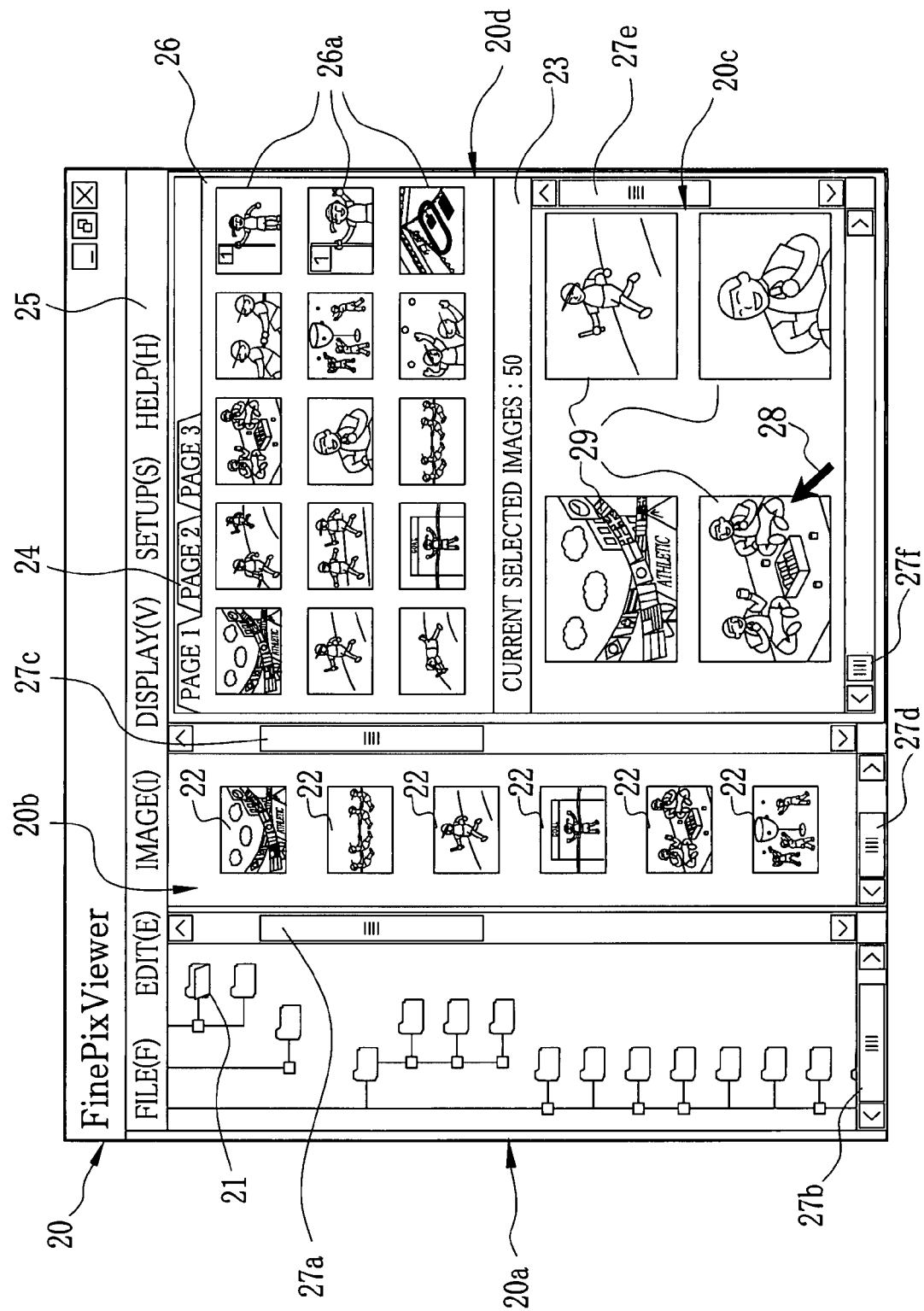
FIG. 2 is an explanatory view of an image display browser window.

As shown in FIG. 2, the image display browser 20 is composed of an explorer window 20a to help finding a desired folder 21, a thumbnail window 20b to display thumbnail images 22 in the folder 21, a selected image window 20c to display selected images 29, and a layout window 20d to display a later described layout image 26. Moving a cursor 28 to a thumbnail image 22 and double clicking on the mouse 5b will select this thumbnail image 22 as the selected image 29, which is then displayed in the selected image window 20c. A current total of the selected images 29 is shown on a image number indicator 23. The selected images 29 are larger than the thumbnail images 22, and displayed in the selected image window 20c in the same order as selected. It is, however, possible to sort the selected images 29 by date or to drag and drop them for a desired sequence.

The cursor 28 indicates the position of the mouse 5b in the image display browser 20, and moves in response to the mouse 5b. Each of the windows 20a to 20c has two scroll bars 27a to 27f on the right and the bottom. These scroll bars 27a to 27f are slid to scroll the windows in the corresponding directions. Additionally, a menu bar 25 that includes plural menu items is provided at an upper area of the image display browser 20. Selecting a menu from the menu bar 25, the user can perform various operations on image display browser 20, such as sorting the selected images 29 by date in the selected image window 20c, displaying the layout image 26 in full screen, and printing the layout image 26 on the printer 9. In the layout window 20d, plural layout images 26 are overlapped, and each layout image 26 has a page tab 24 on the top. Moving the cursor 28 to a desired page tab 24 and clicking on the mouse 5b leads the layout image 26 of selected page to appear in the layout window 20d.

The layout image 26 is a synthetic image composed of plural image display frames 26a and selected images 26 separately inserted therein. This layout image 26 can be, for example, an index image that displays a list of pictures. Each of the selected images 29 is diminished and inserted into the image display frames 26a. The image display frames 26a can take several different layout patterns, one of which is selected when the layout image 26 is produced.

Depending on the layout pattern selected, the size of the image display frame 26a and the number of the image display frames 26a in the layout image 26 change. Since the size of the layout image 26 is fixed according to the print size or the stored size, the image display frames 26a will be small when the layout pattern with a lot of the image display frames 26a is selected, and will be large when the layout pattern with a few image display frames 26a is selected.

Generally, the face of a person appears smaller in a picture with several persons than a picture with a single person, and the face is getting even smaller as the number of people increases in a picture. The face is easily viewed when it appears large, for sure, and it is thus preferred to display the faces in the selected images 29 as large as possible in the layout image 26. Accordingly, the layout pattern of the image display frames 26a is determined depending on the number of people in the selected images 29 to be used. This process is now described below.

Figure 3:
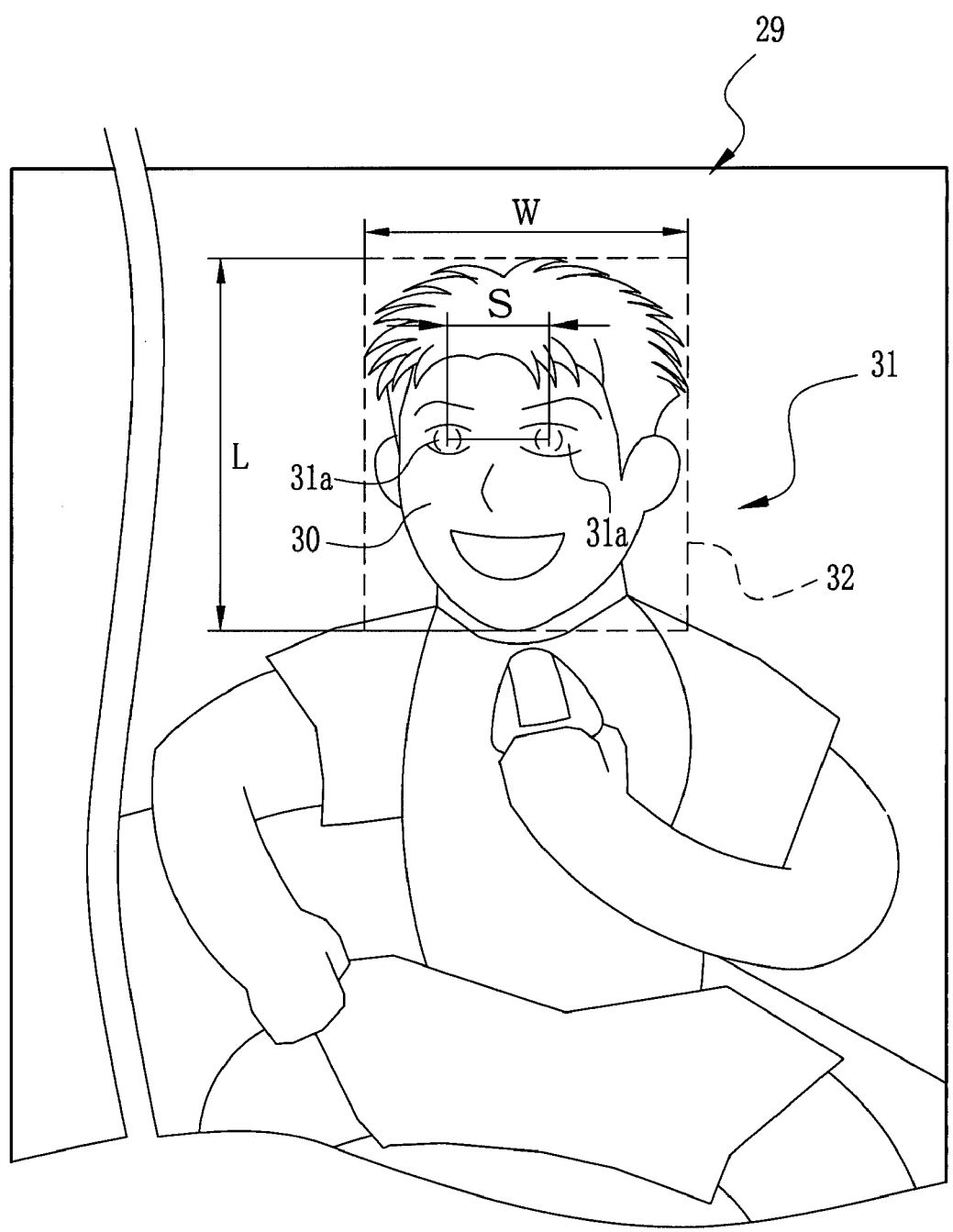
FIG. 3 is an explanatory view of a face area.

Referring back to FIG. 1, the face image counter 13 detects the faces of people in the selected image 29, and counts the number of the faces (hereinafter, face number). The face image counter 13 detects a face image 30 by, for example as shown in FIG. 3, matching both eyes 31a of a detected person 31 in the selected image 29 with preset image data of a typical person's eyes. The face image counter 13 conveys the number of the counted face images to the average number calculator 17. It is to be noted that the face image 30 may also be detected based on the relation of the eyes and the mouth, the outline of the face, or the skin color of the face.

The average number calculator 17 calculates an average number of the face images in a single selected image 29 by firstly summing up the number of the counted face images, and then dividing the sum by the number of the image display frames 26a previously set in the table 18. The average number of the face images is sent to the pattern selector 14.

The pattern selector 14 determines the layout pattern of the image display frames 26a based on the average number of the face images and a threshold number of the face images set in the table 18. The table 18 is composed of, for example, layout patterns 1-3 (i), and their own numbers (Ki) of the image display frames 26a, the columns and rows (Li×Mi) of the image display frames 26a, and threshold numbers (THi) of the face images, as shown in TABLE 1 below. Among the layout patterns 1-3, the layout pattern 1 contains the fewest number of the image display frames 26a (Ki), with 15 image display frames 26a of the largest size. These 15 image display frames are arranged in a 3 (columns)×5 (rows) matrix. The layout pattern 3 contains the most number of the image display frames 26a (Ki), with 40 image display frames 26a of the smallest size. These 40 image display frames are arranged in a 5 (columns)×8 (rows) matrix. The layout pattern 2 is in the middle about the number (Ki) and the size of the image display frames 26a, with 24 image display frames 26a arranged in a 4 (columns)×6 (rows) matrix.

The threshold number (THi) of the face images is a favorable number of the face images in a single selected image 29, and predetermined according to the size of the image display frame 26a. If a selected image 29 with many face images is inserted into a relatively small image display frame 26a such as of the layout pattern 3, each face image will become too small to see. If inserted into a relatively large image display frame 26a such as of the layout pattern 1, to the contrary, this selected image 29 is less diminished than in the layout pattern 3, and each face image is kept relatively large even if the selected image 29 has many face images.

In an initial state, the layout pattern 1 is selected and its number of image display frames (Ki), i.e., fifteen becomes the number of the selected images 29 to be used in the layout image 29. Accordingly, the pattern selector 14 extracts the forefront fifteen selected images 29 from the selected image window 20c. The face image counter 13 counts the face images in these fifteen selected images 29. The average number calculator 17 divides the sum of the face images by the number of image display frames, or fifteen in this case, so as to calculate an average number Av of the face images per a single selected image 29. The pattern selector 14 firstly compares this calculated average number Av with the threshold number (TH1=3) of the layout pattern 1, and then fixes the layout pattern to 1 when the condition Av≧3 is satisfied. If the Av is less than 3, on the other hand, the pattern selector 14 selects the layout pattern 2 from the table 18 and extracts the forefront twenty-four selected images 29, the same number as K2, from the selected image window 20c. The face image counter 13 counts the face images in these twenty-four selected images 29. The pattern selector 14 fixes the layout pattern to 2 when the Av is larger than or equal to the threshold number (TH2=1) of the layout pattern 2. If the Av is less than 1, the pattern selector 14 selects the layout pattern 3. Since the layout pattern 3 (imax) is set to contain the maximum number of image display frames (K3=40) in this embodiment, the number of the face images is not considered when the layout pattern 3 is selected. Accordingly, the threshold number TH3 is not provided. The number of the face images is also not considered when the number of the selected images 29 is less than fifteen (K1), and in this case the layout pattern is fixed to 1. The fixed layout pattern is informed to the image layout section 16.

TABLE 1

| LAYOUT PATTERN (i) | NUMBER OF FRAMES* (Ki) | COLUMNS AND ROWS OF FRAMES* (Li × Mi) | THRESHOLD NUMBER OF FACE IMAGES (THi) |
| --- | --- | --- | --- |
| 1 | 15 | 3 × 5 | 3 |
| 2 | 24 | 4 × 6 | 1 |
| 3 | 40 | 5 × 8 | |

*image display frames

The image layout section 16 produces the layout image 26 by inserting the selected images 29 into the image display frames 26a in the fixed layout pattern. The layout image 26 is displayed in the layout window 20d, and its image data is temporarily stored in the memory 3. This image data will be stored properly in the memory 3 when the user commands on the operating section 5 to store the layout image 26. Alternatively, the image data is deleted from the memory 3 when the user commands to delete the layout image 26.

Figure 4A:
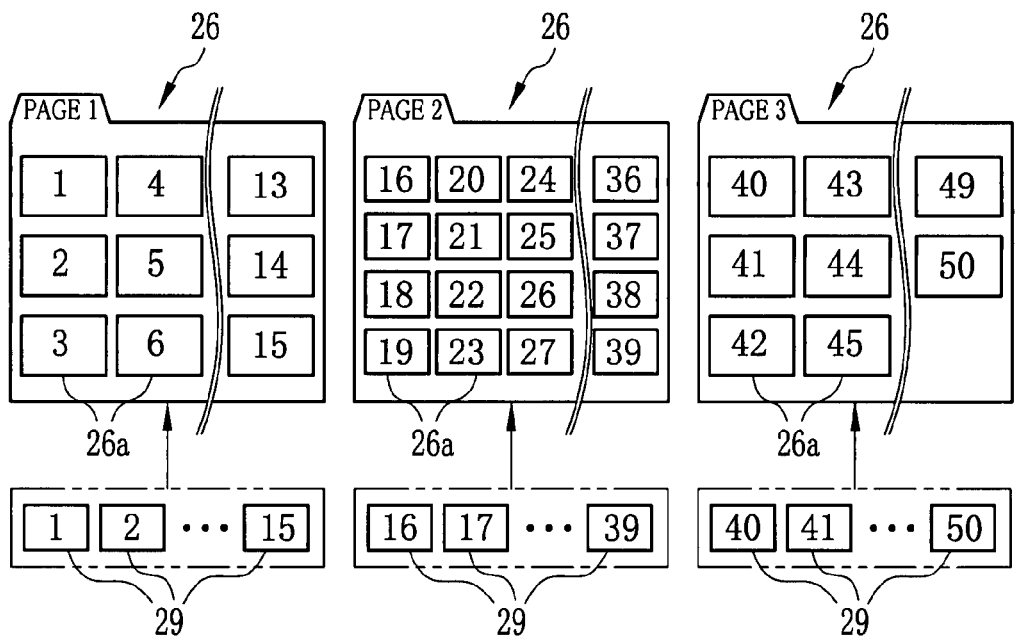
FIG. 4A and FIG. 4B are explanatory views of layout images.

Next, the method for producing the layout image 26 is explained with reference to FIG. 4A and FIG. 4B. The layout images 26 in FIG. 4A are produced from fifty selected images 29. As for the forefront fifteen selected images 29, the average number Av of the face images meets the condition Av≧3 (TH1), and therefore the fifteen (K1) selected images 29 are inserted into the image display frames 26a in the 3×5 (L1× M1) layout to compose a page 1 layout image 26. The succeeding fifteen selected images 29 fail to meet the condition $Av \geq 3$ (TH1). Consequently, the layout pattern 2 is selected, and twenty-four selected images 29 are extracted. As for these twenty-four selected images 29, the average number Av of the face images meets the condition $Av \geq 1$ (TH2) and therefore the twenty-four (K2) selected images 29 are inserted into the image display frames 26a in the 4×6 (L2×M2) layout to compose a page 2 layout image 26. Since there remain only ten selected images 29, a page 3 layout image 26 contains the ten selected images 29 inserted into the image display frames 26a in the 3×5 (L1×M1) layout.

Figure 4B:
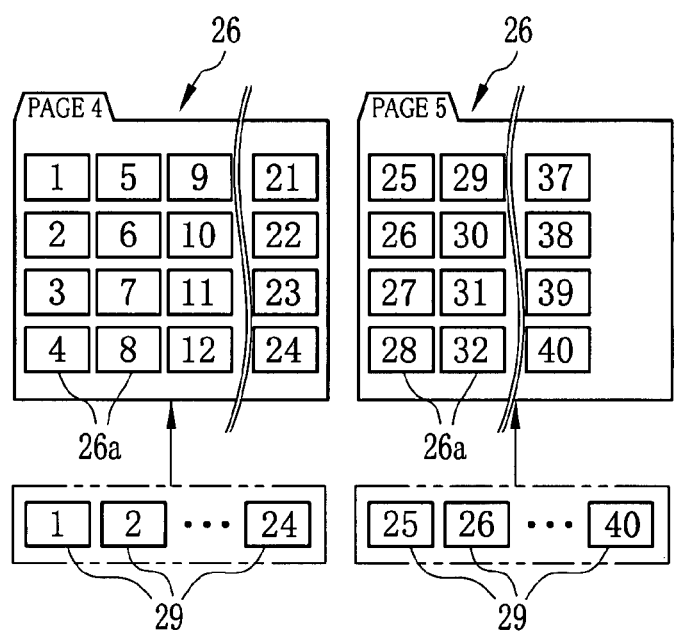

FIG. 4B shows the layout images 26 produced from 40 selected images 29. Here, while the forefront fifteen selected images 29 do not meet the condition $Av \geq 3$ (TH1), the forefront twenty-four selected images do the condition $Av \geq 1$ (TH2). Accordingly, a page 4 layout image 26 has twenty-four (K2) image display frames 26a in the 4×6 (L2×M2) layout. The succeeding fifteen selected images 29 do not meet the condition $Av \geq 3$ (TH1), and the layout pattern 2 is thus selected. Since there remain only sixteen selected images 29, Thi is not considered and the layout pattern is fixed to 2 for a page 5 layout image 26, which therefore has twenty-four (K2) image display frames 26a in the 4×6 (L2×M2) layout.

Figure 5:
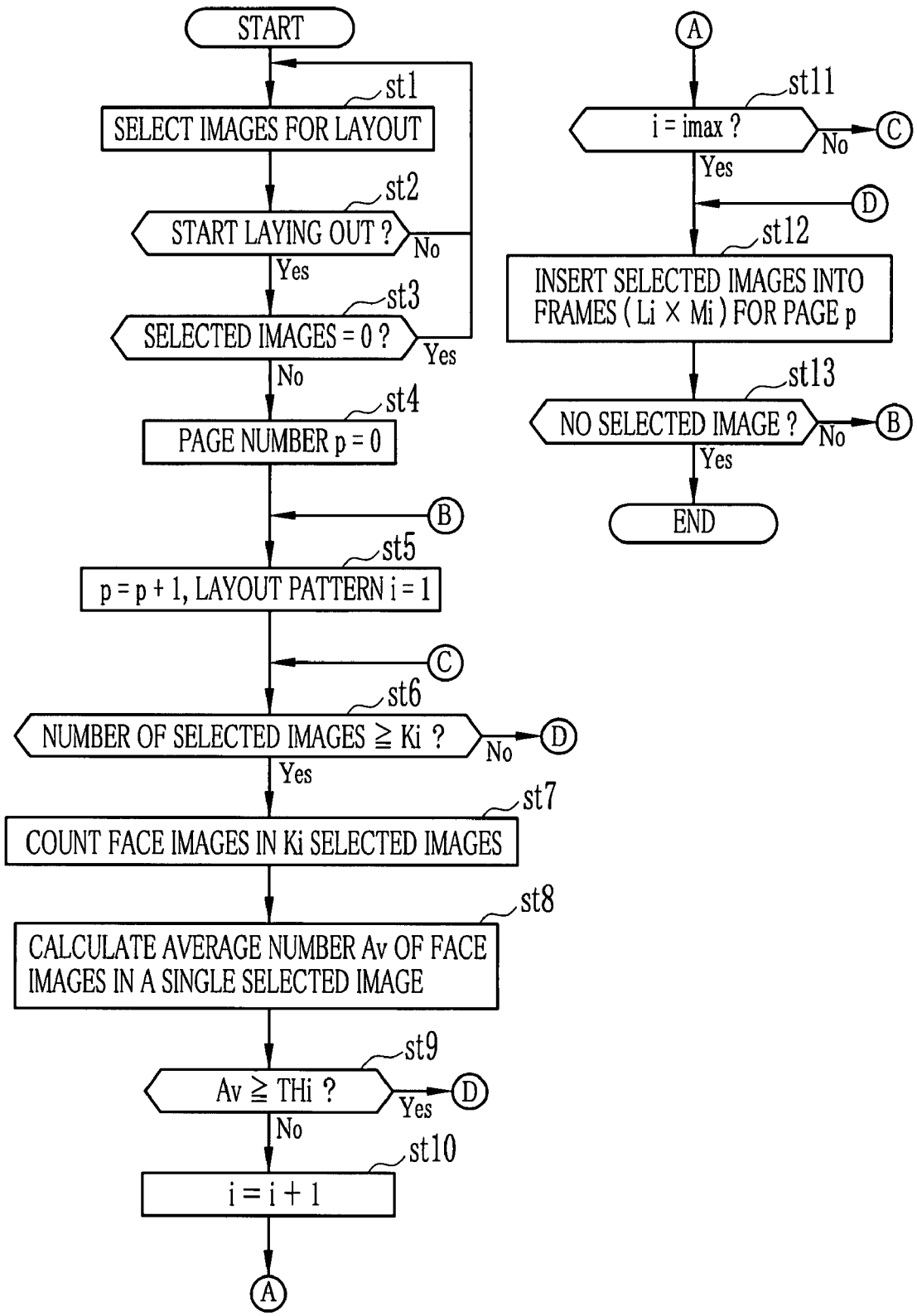
FIG. 5 is a flow chart of image processing procedure.

The procedure for producing the layout image 26 is now explained with reference to FIG. 5. When the image display browser 20 is started and displayed on the monitor 4, the user selects one or more thumbnail images 22 from the thumbnail window 20b (st1) to display them as the selected images 29 in the selected image window 20c. Then, a layout function menu is selected from the menu bar 25, and the layout process is started (st2). If there is no selected image 29 at this time (st3), the user is directed to return to the image selecting step (st1). If there is one or more selected images 29, a page number (p) is once set to 0 (st4) and then increased by 1, and the layout pattern i is set to 1 (st5). The forefront Ki pieces of the selected images 29 are extracted from the selected image window 20c. It is then judged that the number of the selected images 29 extracted is Ki (st6), and the face images are counted (st7). The average number Av is calculated by dividing the total number of the face images by Ki (st8). When the condition $Av \geq Thi$ is satisfied (st9), the layout pattern is fixed to i, and a page p layout image 26 is produced by inserting the Ki pieces of the selected images 29 into the image display frames 26a in the Li×Mi layout (st12). When the selected images 26 are less than Ki (st6), the page p layout image 26 is produced with the layout pattern i (Li×Mi) currently selected (st12). When the condition $Av \geq Thi$ is not satisfied (st9), the layout pattern i is increased by 1 (st10). If the last layout pattern (imax) is not selected (st11), the procedure returns to the step 6. If the last pattern (imax) is selected (st11), on the other hand, the page p layout image 26 is produced with the layout pattern imax (st12). The user repeats the procedure from the step 5 until no selected image 29 remains, and then completes the procedure (st13).

As described above, the number of the image display frames 26a is determined optimally for the layout image 26 based on the number of the face images in the selected images 29. It is to be noted that the layout pattern is not necessarily a matrix, and in this case there is no need to provide the vertical and horizontal numbers of the image layout frames 26a.

Figure 6:
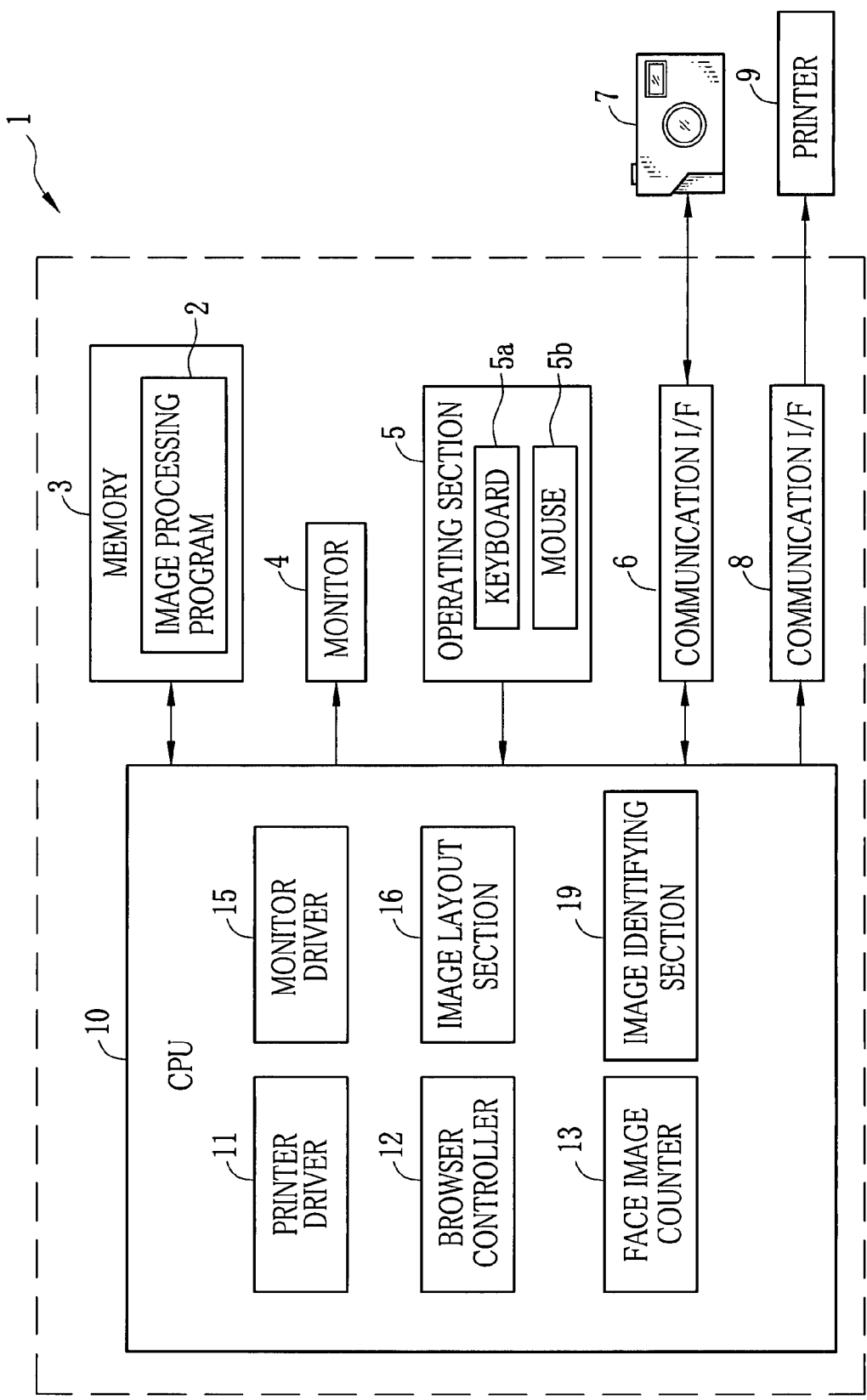
FIG. 6 is a block diagram of an image processing device according to a second embodiment of the present invention.
Figure 7:
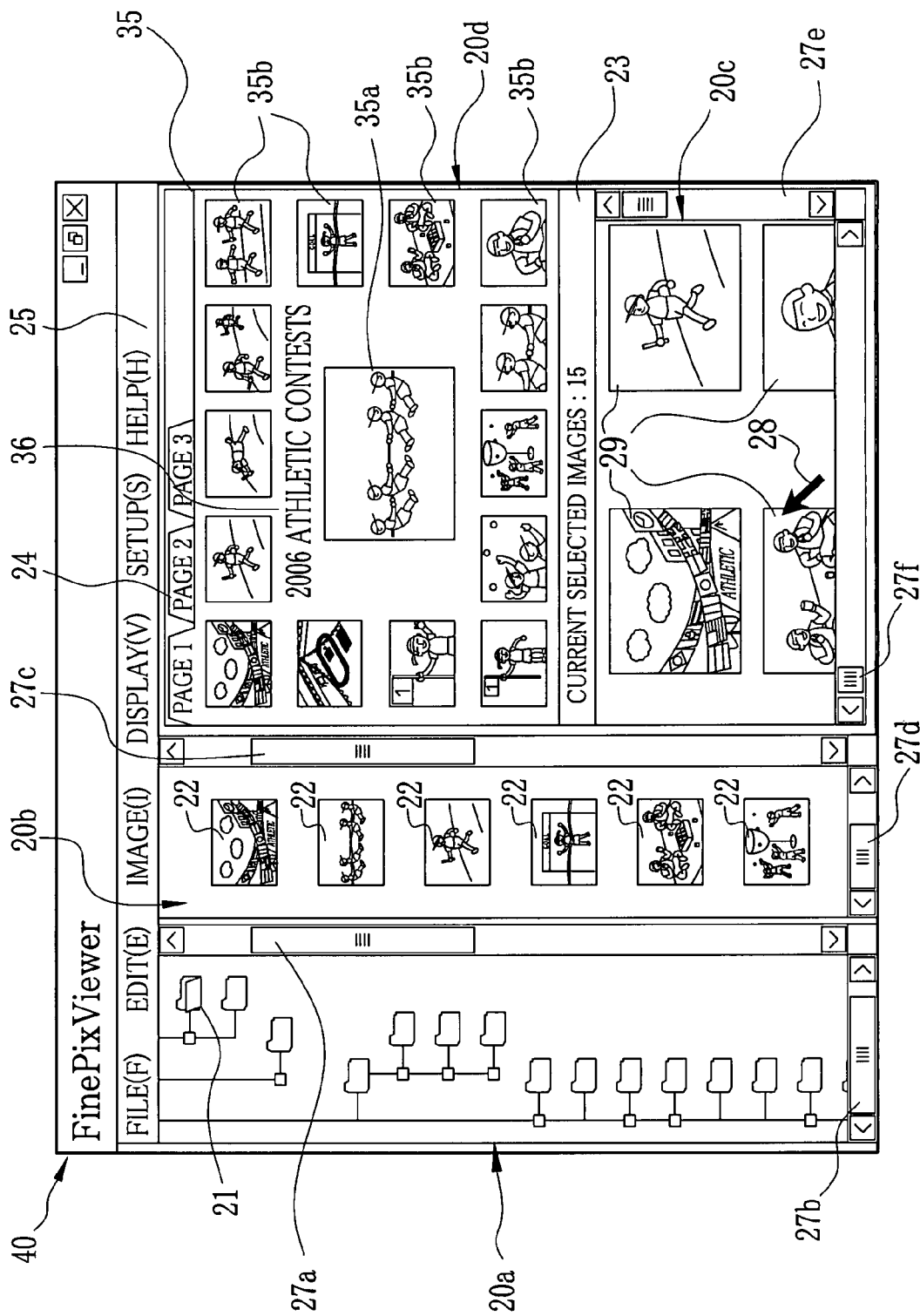
FIG. 7 is an explanatory view of an image display browser window according to the second embodiment.

Next, with reference to FIG. 6 and FIG. 7, a second embodiment of the present invention is explained. In this second embodiment, the components identical to those in the first embodiment are denoted by the same reference numerals, and the detailed explanations thereof are omitted. The browser controller 12 controls an image display browser 40 which is different from the image display browser 20 of the first embodiment only in a layout image 35 in the layout window 20d. The layout image 35 is composed of an enlarged display frame 35a disposed in the center to enlarge the selected image 29 and plural normal display frames 35b around it. An image identifying section 19 identifies the selected image 29 with most face images, which is then inserted into the enlarged display frame 35a. The remaining selected images 29 are inserted into the normal display frames 35b. Additionally, the user can put a title 36 above the enlarged display frame 35a.

The face image counter 13 counts the face images in every selected image 29 in the selected image window 20c, and conveys the number of the counted face images to image identifying section 19. The identifying section 19 identifies the selected image 29 with most face images. If there is more than one selected image 29 identified, in other words, more than one selected image 29 with the largest number of the face images 30, the image identifying section 19 further identifies one of these selected images 29 with the smallest total size of the face images 30. The size of the face image 30 is measured by the method below.

As shown in FIG. 3, the both eyes 31a of the person 31 is detected in every selected image 29 during the count of the face images 30. The image identifying section 19 estimates, from an inter-eye distance S of the detected both eyes 31a, a width W and a length L of the face, and identifies the area defined by the width W and the length L as a face area 32 (enclosed with dotted lines).

This estimation may be carried out by using, for example, the pre-stored inter-eye distance $S_A$ and face width $W_A$ of a typical person. The width W is then calculated from the ratio to the inter-eye distance S (of the detected both eyes) expressed by the formula $W=(S/S_A) \times W_A$. Similarly, the length L is calculated by using the inter-eye distance $S_A$ and the face length $L_A$ of a typical person. The extent of the face area 32 measured from the face width W and the face length L is regarded as the size of the face image 30. It is to be noted that the face area 32 may also be identified based on the relation of the eyes and the mouth, the outline of the face, or the skin color of the face.

The image layout section 16 produces the layout image 35 by inserting the selected image 29 identified by the image identifying section 19 into the enlarged display frame 35a and inserting the remaining selected images 29 into the normal display frames 35b. If the number of the selected images 29 in the selected image window 20c is more or less than the number of the image display frames (the enlarged display frame 35a+ the normal display frames 35b) at this stage, an error message or such is provided to prompt the user to reselect the images. Alternatively, it may be possible to produce the layout image 35 with some blank normal display frames 35b when the selected images 29 are less than the image display frames. It may also be possible, when the selected images 29 are more than the image display frames, to extract as much selected images 29 as the image display frames automatically and produce the layout image 35.

Figure 8:
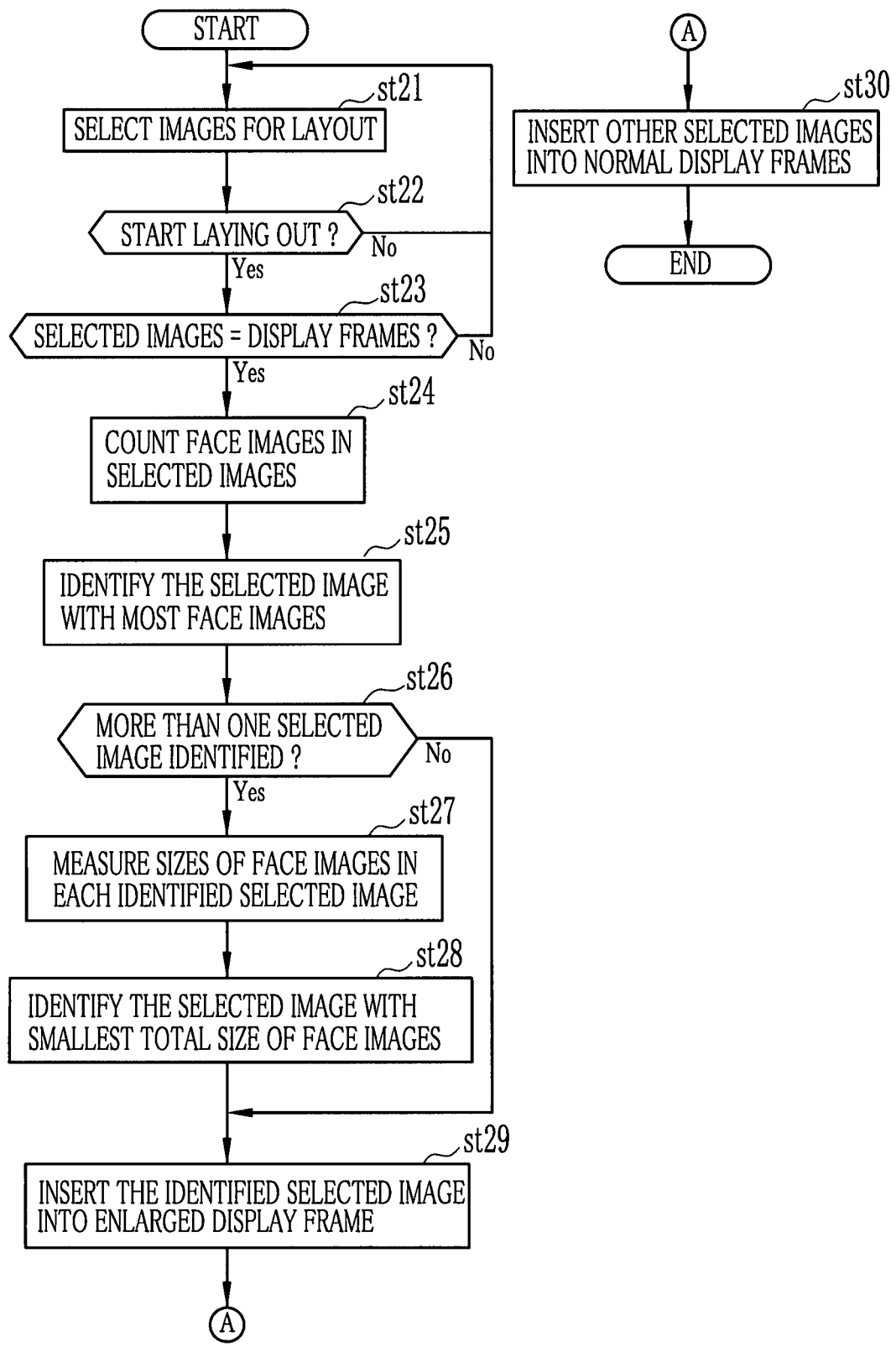
FIG. 8 is a flow chart of image processing procedure according to the second embodiment.

Referring to FIG. 8, the procedure for producing the layout image 35 is now explained. When the image display browser 40 is started and displayed on the monitor 4, the user selects the thumbnail images 22 for the layout image 35, and they are displayed as the selected images 29 in the selected image window 20c (st21). Then, a layout function menu is selected from the menu bar 25, and the layout process is started (st22). If the selected images 29 are more or less than the image display frames (st23), the user returns to the image selecting step (st21). When the number of the selected images 29 is identical to the number of the image frames, the face images are counted in every selected image 29 (st24) to identify the selected image 29 with most face images (st25). If there is more than one selected image 29 identified (st26), Each face image in these selected images 29 is measured (st27), and the selected image 29 with the smallest total size of the face images is identified (st28). The selected image 29 thus identified is inserted into the enlarged display frame 35a (st29), while the remaining selected images 29 are inserted into the normal display frames 35b (st30). In this embodiment, the selected images 29 are inserted successively in the clockwise direction from the upper left corner of the layout image 35.

As describe above, the image having the largest number of people is enlarged in the enlarged display frame 35a in the center of the layout image 35. It is possible, in the second embodiment, to provide more than one enlarged display frame 35a. It is also possible to prepare several arrangement patterns for the normal display frames 35b, so that the normal display frames 35b will have different sizes according to the number of the selected images 29 to be used.

Although the selected images 29 and the layout image 26 or 35 are displayed on the same screen in the above embodiments, it may be possible to switch between, for example, a screen for the selected images 29 and a screen for the layout image 26 or 35.

The selected images 29 are selected by the cursor 28 moving along the mouse 5b in the above embodiments, the selected images 29 may however be selected through an input device such as cursor keys of the keyboard 5a or a tablet (not shown).

While having been explained with the personal computer, the present invention is also applicable to various electronic devices, such as digital still cameras, digital video cameras, photo-storages, PDAs, and mobile phones.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image processing device for producing a layout image in which plural selected images are inserted separately into image display frames, said image processing device comprising:
    a memory storing plural layout patterns with different numbers of said image display frames, said image display frames getting larger as said number of said image display frames decreasing;
    an average number calculator for detecting and counting face images of photographed people in said each selected image, and for calculating an average number of said face images; and
    a pattern selector for selecting one of said layout patterns based on said average number, such that said face images do not become too small in said layout image.

2. The image processing device of claim 1, wherein said memory stores a threshold number of said face images for each said layout pattern, said threshold number being a proper number of said face images to be displayed in one said image display frame, and wherein said pattern selector compares said threshold number with said average number when selecting said layout pattern.

3. The image processing device of claim 1, wherein one said layout pattern with the fewest number of said image display frames is set as a default pattern, and wherein said pattern selector selects said layout pattern with the fewest number of said image display frames, regardless of said average number, when the number of said selected images is less than said fewest number.

4. The image processing device of claim 3, wherein when the number of said selected images is more than said fewest number, said average number calculator extracts as many said selected images as said fewest number and calculates an average number of said face images.

5. The image processing device of claim 1, wherein the numbers of said image display frames in vertical and horizontal directions of said layout image are determined for each said layout pattern.

6. The image processing device of claim 1, wherein said average number calculator detects said face image by finding both eyes of each photographed person in said selected image.

7. The image processing device of claim 1 further comprising:
    an output unit for outputting said layout image to a monitor device or a printer.

8. A non-transitory computer readable medium storing an image processing program for producing a layout image in which plural selected images are inserted separately into image display frames, said image processing program directing a computer to execute steps of:
    detecting and counting face images of photographed people in said each selected image, and calculating an average number of said face images; and
    selecting one of layout patterns of said image display frames based on said average number, such that said face images do not become too small in said layout image, said layout patterns being stored in a memory and having different numbers of said image display frames, said image display frames getting larger as said number of said image display frames decreasing.

9. The image processing program of claim 8, wherein said memory stores a threshold number of said face images for each said layout pattern, said threshold number being a proper number of said face images to be displayed in one said image display frame, and being compared with said average number in said pattern selecting step.

10. The image processing program of claim 8, wherein one said layout pattern with the fewest number of said image display frames is set as a default pattern, and wherein said layout pattern with the fewest number of said image display frames is selected in said pattern selecting step, regardless of said average number, when the number of said selected images is less than said fewest number.

11. The image processing program of claim 10, wherein when the number of said selected images is more than said fewest number, as many said selected images as said fewest number are extracted, and an average number of said face images is calculated in said average number calculating step.

12. The image processing program of claim 8, wherein the numbers of said image display frames in vertical and horizontal directions of said layout image are determined for each said layout pattern.

13. The image processing program of claim 8, wherein said face image is detected in said average number calculating step by finding both eyes of each photographed person in said selected image.

14. The image processing program of claim 8, further directing said computer to execute a step of:
    outputting said layout image to a monitor device or a printer.

* * * * *